United States Patent
Jindal et al.

(10) Patent No.: US 6,405,264 B1
(45) Date of Patent: *Jun. 11, 2002

(54) MARSHALING AND UNMARSHALING FRAMEWORK FOR SUPPORTING FILTERS IN A DISTRIBUTED OBJECT SYSTEM

(75) Inventors: Anita Jindal, Cupertino; Ken M. Cavanaugh, Montara; Sanjeev Krishnan, Sunnyvale, all of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,263

(22) Filed: Dec. 18, 1997

(51) Int. Cl.[7] .................................. G06F 9/54
(52) U.S. Cl. ...................... 709/316; 709/315
(58) Field of Search ................. 709/316, 315

(56) References Cited

U.S. PATENT DOCUMENTS

| | | | |
|---|---|---|---|
| 4,823,310 A | | 4/1989 | Grand |
| 5,307,490 A | * | 4/1994 | Davidson et al. ........... 709/203 |
| 5,481,706 A | | 1/1996 | Peek |
| 5,619,710 A | | 4/1997 | Travis, Jr. et al. |
| 5,692,157 A | | 11/1997 | Williams |
| 5,699,518 A | | 12/1997 | Held et al. |
| 5,727,145 A | | 3/1998 | Nessett et al. |
| 5,734,903 A | | 3/1998 | Saulpaugh et al. |
| 5,737,607 A | | 4/1998 | Hamilton et al. |
| 5,740,355 A | | 4/1998 | Watanabe et al. |
| 5,748,881 A | | 5/1998 | Lewis et al. |
| 5,751,962 A | | 5/1998 | Fanshier et al. |
| 5,758,342 A | | 5/1998 | Gregerson |
| 5,793,965 A | | 8/1998 | Vanderbilt et al. |
| 5,809,507 A | | 9/1998 | Cavanaugh, III |
| 5,815,703 A | | 9/1998 | Copeland et al. |
| 5,819,093 A | | 10/1998 | Davidson et al. |
| 5,832,487 A | | 11/1998 | Olds et al. |
| 5,835,906 A | | 11/1998 | Hagersten et al. |
| 5,848,236 A | | 12/1998 | Dearth et al. |
| 5,852,731 A | | 12/1998 | Wang et al. |

(List continued on next page.)

FOREIGN PATENT DOCUMENTS

EP 0643349 A1 3/1995

OTHER PUBLICATIONS

Reddy, G. Sriram et al. "Filter Objects for Distributed Object Systems" JOOP, Jan. 2001.*
Rushikesh K. Joshi et al. "Message filters for Object-oriented Systems" Jun. 1997.*
Schmidt, Douglas et al. "Comparing Alternative Programming Techniques for Multithreaded Servers", Feb. 1996.*
Internet. "Programming with Java IDL", Nov. 1997.*

(List continued on next page.)

Primary Examiner—St. John Courtenay, III
Assistant Examiner—Lewis A. Bullock, Jr.
(74) Attorney, Agent, or Firm—Kudirka & Jobse, LLP

(57) ABSTRACT

In order to support filtering operations in a CORBA system, the marshaling and unmarshaling process is encapsulated in a server invocation object created from a class which contains data, including the request ID, the marshal buffer and the marshal and unmarshal methods. Filtering is supported by extending the class with a subclass that overrides the marshal and unmarshal methods to invoke the filters at the proper points. During operation, the CORBA object request broker examines the request to determine whether filtering is requested and instantiates a server invocation object either from the parent class, if filtering is not requested, or from the subclass, if filtering is requested.

21 Claims, 9 Drawing Sheets

U.S. PATENT DOCUMENTS

| | | | |
|---|---|---|---|
| 5,862,376 | A | 1/1999 | Steele, Jr. et al. |
| 5,870,805 | A | 2/1999 | Bracho et al. |
| 5,873,116 | A | 2/1999 | Van Fleet |
| 5,881,315 | A | 3/1999 | Cohen |
| 5,892,946 | A | 4/1999 | Woster et al. |
| 5,893,118 | A | 4/1999 | Sonderegger |
| 5,907,675 | A | 5/1999 | Aahlad |
| 5,953,530 | A | 9/1999 | Rishi et al. |
| 5,958,006 | A | 9/1999 | Eggleston et al. |
| 5,974,410 | A | 10/1999 | Copeland et al. |
| 5,991,823 | A | 11/1999 | Cavanaugh, III et al. |
| 6,016,499 | A | 1/2000 | Ferguson |
| 6,032,199 | A * | 2/2000 | Lim et al. ............... 709/316 |
| 6,044,409 | A | 3/2000 | Lim et al. |
| 6,101,569 | A | 8/2000 | Miyamoto et al. |
| 6,128,640 | A | 10/2000 | Kleinman |
| 6,189,048 | B1 * | 2/2001 | Lim et al. ............... 709/330 |
| 6,226,691 | B1 * | 5/2001 | Cantin et al. ............ 709/316 |
| 6,249,803 | B1 * | 6/2001 | Jindal et al. ............ 709/203 |
| 6,269,407 | B1 * | 7/2001 | Cink et al. ............. 709/315 |

OTHER PUBLICATIONS

JAVADOC. "Java Object Persistence", Sep. 1996.*

OMG Security Specification Document Formal/Nov. 5, 1997, pp. 15–9 to 15–10; pp. 15–147 to 15–162 (Section 15–7); pp. 15–219 to 15–230 (appendix B–6 to B–9.3) OMG Website—www.omg.org.

The Orbix 2 Reference Guide, Release 2.0 Nov. 1995, pp. 197–209; The Orbix 2 Programming Guide, Release 2.0 Nov. 1995, pp. 143, pp. 189–196, pp. 303–304—Support@iona.com.

Evaluations, Orbix (IONA), pp. 1–2—http://www.c3.lanl.gov/village/dist–comp/section2$_{13}$5_2.html.

Orbix, Market–Leading Implementation of CORBA 2, pp. 1–3—http://www.blackwhite.com/products/orbix.html.

IONA Technologies, IONA Delivers Full Suite of Features for Orbix 2.1, pp. 1–2—http://www.iona.com/news/pressroom/Orbix21Features.html.

Iona Technologies, Apr. 1994, Version 1.2.1 Release Notes, pp. 1–4—http://www.up.ac.za/hsn/docs/orbix/RelNotes12.txt.

IONA Technologies, Orbix C+++ Version(s): All, pp. 1—http://www–usa.iona.com/support/kb/Orbix_C++/articles/324.805.html.

IONA Technologies, Orbix C++ Version(s): 2.x, pp. 1—http://www–usa.iona.com/support/kb/Orbix_C++/articles/238.214.html.

IONA Technologies, Orbix C++ Version(s) :2.x, pp. 1–2—http://www–usa.iona.com/support/kb/Orbix_C++/article/239.540.html.

IONA Technologoes, Orbix C++ Version(s) : All, pp. 1–2—http://www–usa.iona.com/support/kb/Orbix_C++/articles/351.196.html.

IONA Technologies, Orbix C++ Version(s): All, pp. 1–2—http://www–usa.iona.com/support/kb/Orbix_C++/articles/352.291.html.

IBM Technical Disclosure Bulletin, "Remote Procedure Call Stub Size Reduction Technique—Combining Parameter Code", vol. 36, No. 09B, Sep., 1993, pp. 351–352.

IBM Technical Disclosure Bulletin, "Callos2w XP 000587433" vol. 39, No. 04, Apr. 1996, pp. 91–96.

IBM's SOMobjects Developer Toolkit, Users Guide, "An Introductory Guide to the System Object Model and Its Accompanying Frameworks", Version 2.0, Jun., 1993.

Object Management Group, "The Common Object Request Broker: Architecture and Specification" Revision 2.0, Jul., 1995.

Hamilton, Graham, et al., "Subcontract: A Flexible Base for Distributed Programming", Apr., 1993.

Shapiro, Marc, "A Binding Protocol For Distributed Shared Objects", IEEE, 1994, pp. 134–141.

Bhoedjang, R.A.F., "Friendly and Efficient Message Handling", IEEE, 1996, pp. 121–130.

* cited by examiner

MARSHALING AND UNMARSHALING FRAMEWORK FOR SUPPORTING FILTERS IN A DISTRIBUTED OBJECT SYSTEM

CROSS REFERENCE TO RELATED APPLICATIONS

The following U.S. patent applications are related to the present application and are incorporated by reference herein in their entirety:

U.S. patent application Ser. No. 08/554,794, filed Nov. 7, 1995 as a continuation to U.S. patent application Ser. No. 07/995,863, filed Dec. 21, 1992 (now abandoned);

U.S. patent application Ser. No. 08/670,682, filed Jun. 26, 1996;

U.S. patent application Ser. No. 08/673,181, filed Jun. 26, 1996;

U.S. patent application Ser. No. 08/670,700, filed Jun. 26, 1996;

U.S. patent application Ser. No. 08/670,681, filed Jun. 26, 1996;

U.S. patent application Ser. No. 08/670,684, filed Jun. 26, 1996;

U.S. patent application Ser. No. 08/669,782, filed Jun. 26, 1996;

U.S. patent application entitled "Method and Apparatus for Deferred Throwing of Exceptions in C++", filed by Christian J. Callsen and Ken M. Cavanaugh, assigned attorney docket no. SUNIP171/P2736 and filed on an even date herewith;

U.S. patent application entitled "Method and Apparatus for Fast, Local CORBA Object References", filed by Christian J. Callsen and Ken M. Cavanaugh, assigned attorney docket no. SUN1P170/2735 and filed on an even date herewith;

U.S. patent application entitled "Method and Apparatus for Constructing Stable Iterators in a Shared Data Collection", filed by Christian J. Callsen and Ken M. Cavanaugh, assigned attorney docket no. P2772/PJSI and filed on an even date herewith;

U.S. patent application entitled, "Method and Apparatus for Enforcing Locking Invariants in Multi-Threaded Systems", filed by Christian J. Callsen and Ken M. Cavanaugh, assigned attorney docket no. P2747/PJSI and filed on an even date herewith;

U.S. patent application entitled, "Filter Framework for Executing Code During Method Invocation", filed by Anita Jindal, Ken M. Cavanaugh, Sanjeev Krishnan and Rohit Garg, assigned attorney docket no. P2755/PJSI and filed on an even date herewith; and U.S. patent application Entitled, "Method and Apparatus for Efficient Representation of Variable Length Identifiers in a Distributed Object System", filed by Ken M. Cavanaugh, assigned attorney docket no. P2750/PJSI and filed on an even date herewith.

FIELD OF THE INVENTION

This invention relates to distributed object systems using Common Object Request Broker Architecture (CORBA) and, more particularly, to a method and apparatus for implementing pre-marshaling and post-marshaling filters in an object request broker.

BACKGROUND OF THE INVENTION

Software programs are continually becoming more complicated. Early programs consisted of straightforward procedural code that presented a simple, command line interface and text display to the user. These simple programs have gradually been replaced with complex programs that have graphical user interfaces and multiple features.

As programs have grown in complexity, the amount of effort which is required to write and debug the programs has also increased drastically. Consequently, major efforts have been made to reduce the amount of programming necessary to produce a modern, full-featured product. One of the most successful of these efforts has been the development of object-oriented programming in which programs are designed as collections of discrete elements called "objects". The objects can be modified and reused in many cases, thereby reducing the development effort.

As will be understood by those skilled in the art, objects in the context of object-oriented programming are software entities comprising data and methods or operations on that data. The methods of an object collectively form an interface for manipulating the data in the object. The objects exist only at program runtime and are created, or instantiated, from object "classes" which are actually written by the programmer. The class code written by a programmer can be "reused" by another programmer by instantiating objects from that code.

In order to further reduce the programming burden, distributed object systems have been developed in which methods in objects resident on a server can be executed or invoked remotely over a network from a client application. In this manner, the objects can be developed and maintained by a party different from the party that developed the client application. In such a system information is routed or streamed between the client and the server. This information includes requests from the client to invoke an object on the server and results and data from the method invocation returning from the server to the client. In addition, object-oriented programs often communicate by streaming objects from one program to another.

In such streaming operations, a stream writer organizes, or marshals, the information to form a serial data stream. The serial data stream is then sent to the server where a stream reader unmarshals the serial data stream to reconstruct a copy of the original information. The stream reader must operate such that the unmarshaling exactly "undoes" the effect of the marshaling so that the original information can be reconstructed. Ordinarily, such an operation does not present a problem, but when the stream reader is not written by the same author as the stream writer there can be incompatibilities.

In order to standardize the marshaling and unmarshaling and data transfer process, an industry consortium called the Object Management Group (OMG) was formed whose mission is to define a set of interfaces for inter-operable software. Its first specification, the Common Object Request Broker Architecture (CORBA) specification, is an industry consensus standard that hides all differences between programming languages, operating systems, and object location. The CORBA standard defines an object request broker (ORB) that handles the marshaling, transport and unmarshaling of information between applications. The ORB functions as a communication infrastructure, transparently relaying object requests across distributed heterogeneous computing environments. Inter-operability is accomplished through well-defined object interface specifications which allow client applications to connect to the ORB. CORBA provides an implementation independent notation for defining interfaces called the OMG Interface Definition Language (IDL).

The OMG CORBA specification defines an implementation independent object model which is actually built with a programming language, such as C++ or Java. In this model CORBA objects (also called "servants"), which are implemented by servers, have references that can be exported to clients. Clients and servers are roles, not mutually exclusive tasks for a single program, so that any one program can be both a client and a server. Objects and object references are typically different programming language objects, although they do not have to be.

In a server, the implementation of an actual object which can be used to satisfy an invocation request on a CORBA object is generally both platform and language dependent and various models are possible for implementing objects in servers. The original CORBA standard defined a Basic Object Adapter (or BOA) which is a framework that adapts the server implementation to the implementation independent ORB. A newer OMG portability standard defines a Portable Object adapter (or POA), which replaces the BOA and is intended to be platform independent. Many ORBs also support other proprietary frameworks for implementing CORBA objects. All of these frameworks are commonly referred to as Object Adapters (or OAs).

In some cases, it may be useful to filter a client request before, and after, the marshaling and unmarshaling operations which occur during the delivery of the request from the client to the server. In addition, filtering can be performed before, and after, the marshaling and unmarshaling operations which occur during a reply when results of an invocation are returned from the server to the client. Filters can generally be classified into three categories: pre-marshaling filters, post-marshaling filters, and transform filters. These categories are based on the points in the method invocation process where the filters are applied. The pre and post filters are generally applied in the same order for the client and the server and the filters can be enabled and disabled to provide selective filtering.

Transform filters could be applied to the request, (a) on the client side after all pre/post filters have been applied, and (b) on the server side, before all pre/post filters have been applied to the request. Transform filters could be applied to the reply, (a) on server side after all pre/post filters have been applied to the reply message, and (b) on the client side before pre/post are applied to the reply message. The order in which the transform filters are invoked in one process are opposite of how they are invoked in the other process. Transform filters can also be enabled and disabled.

An application programmer might use the pre and post filters for a variety of reasons. For example, they could be used to log and print messages. They could also be used to send or retrieve extraneous information which does not appear in the request or reply messages. Filters could also be used for implementing simple transaction support without using the service context list, or for providing debugging support for the ORB. Transform filters can be useful for implementing such operations as encryption/decryption of data or data compression.

On the server side, the request and reply arguments are marshaled and unmarshaled in the implementation specific skeleton code. If the filters are enabled and require filtering of the marshaled or unmarshaled data, skeleton code needs to be generated which provides for filter invocation after the marshaling or unmarshaling operation. Therefore, different skeletons would need to be generated depending on the quality of service—whether the request or reply was filterable or non-filterable. The result is proliferation of the skeleton code.

There is therefore a need to achieve different quality of service without requiring changes to the skeleton code for each different quality of service.

SUMMARY OF THE INVENTION

In accordance with the principles of the invention, the marshaling and unmarshaling process is encapsulated in a server invocation object created from a class which contains data, including the request ID, the marshal buffer and the marshal and unmarshal methods. Filtering is supported by extending the class with a subclass that overrides the marshal and unmarshal methods to invoke the filters at the proper points. During method invocation, the ORB examines the request to determine whether filtering is requested and instantiates an invocation object either from the parent class, if filtering is not requested, or from the subclass, if filtering is requested.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
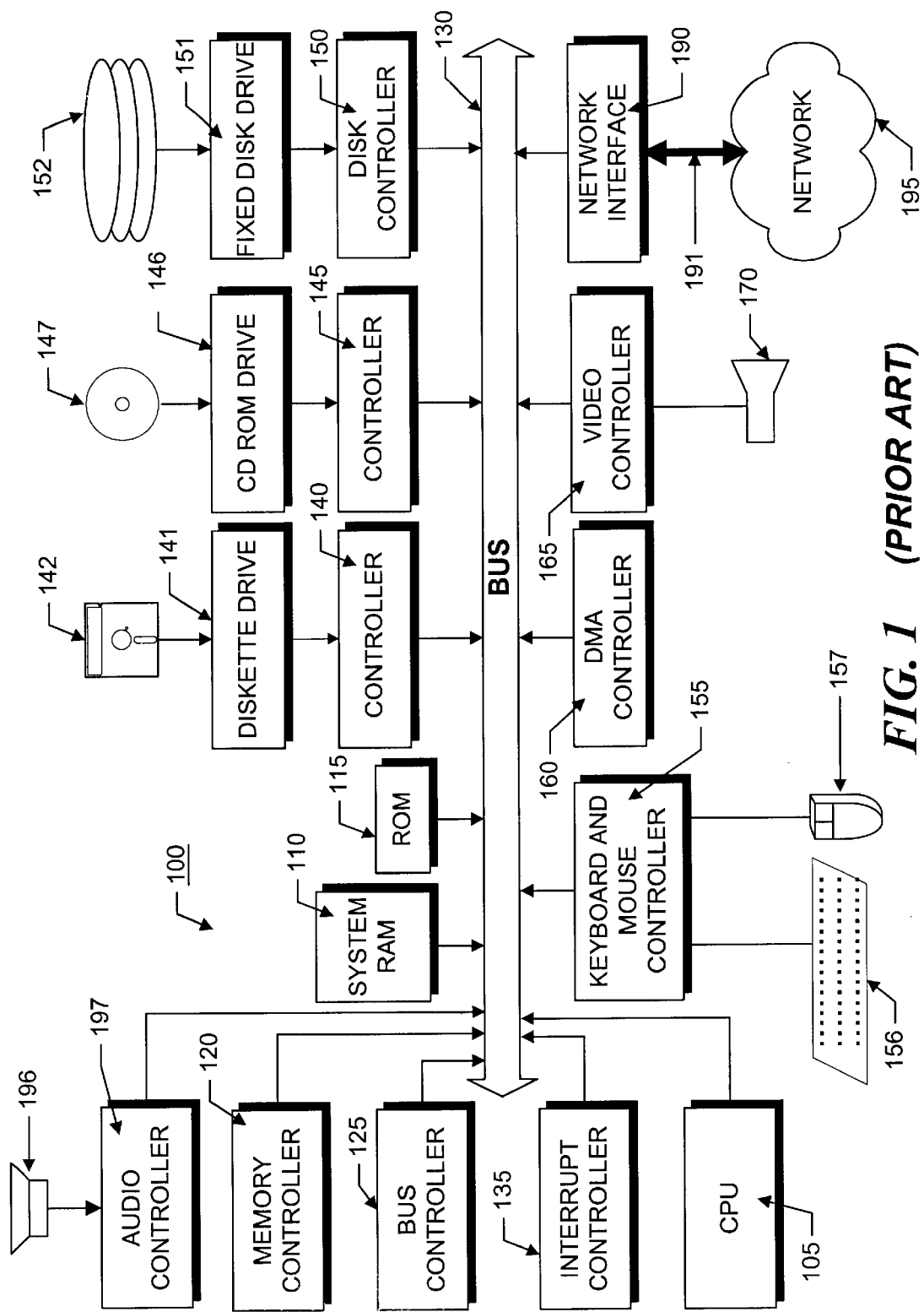
FIG. 1 is a schematic block diagram of an illustrative hardware platform which forms part of a prior art computer system on which the invention can be run.

FIG. 1 illustrates the system architecture for an exemplary client computer 100, such as an IBM THINKPAD 701® computer or Digital Equipment Corporation HiNote™ computer, on which the disclosed network access system (system) can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect multiple network devices.

Client computer system 100 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Figure 2:
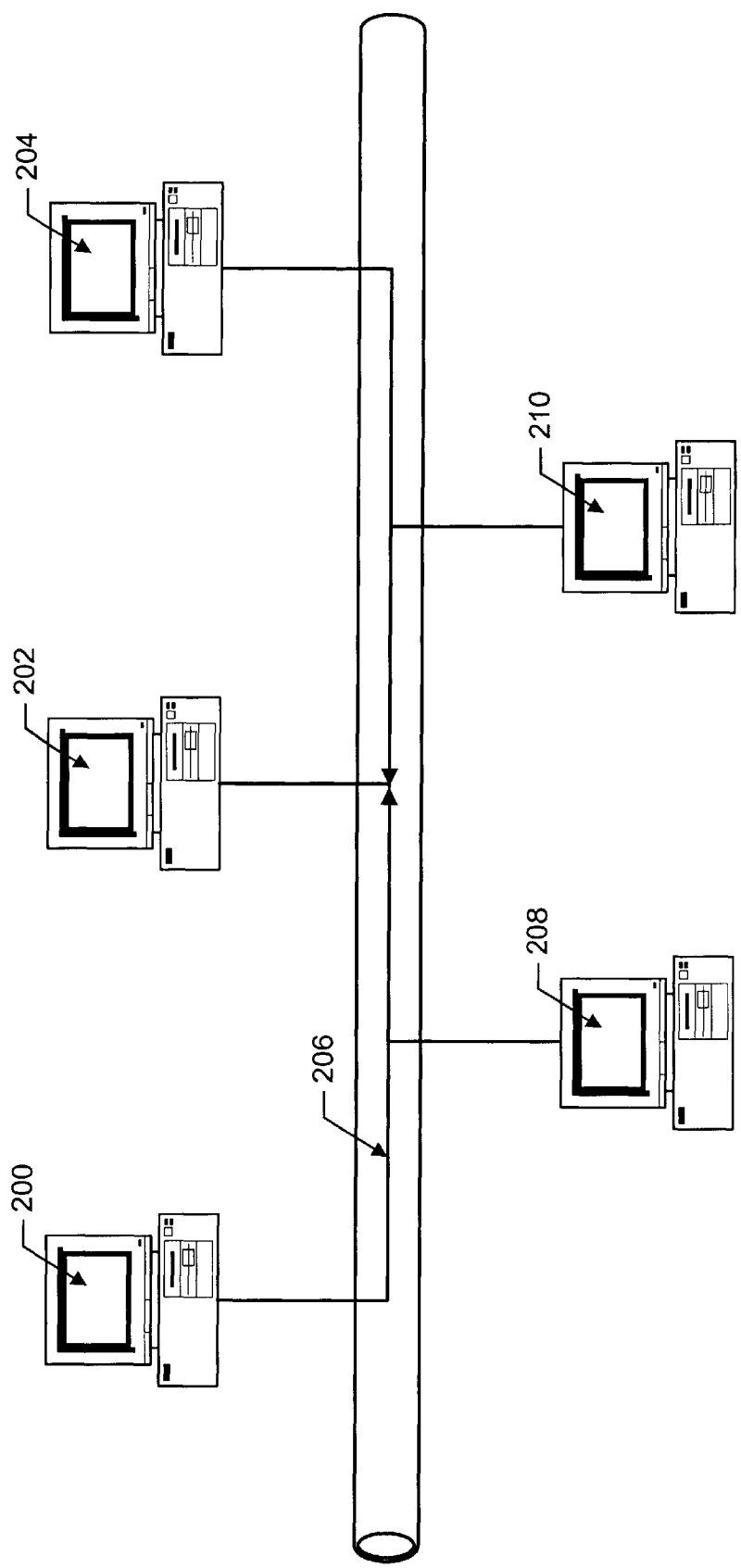
FIG. 2 is a schematic diagram of a prior art computer network system on which a CORBA system can be built.

FIG. 2 illustrates, in a very simple fashion, the connection of a number of computing systems, such as that shown in FIG. 1, to form a distributed computing facility. Each of the individual stations 200, 202, 204, 208 and 210 are interconnected by a network mechanism. Although the distributing computing facility could exist on a single computing system, it is more likely to operate over a network transport medium. Such a transport medium may be LAN as shown in FIG. 2, but may also be other network arrangements, including the Internet. All that is necessary is that the terminals 200, 202, 204, 208 and 210 be able to communicate with each other using predefined protocols to exchange information. As previously mentioned, the CORBA architecture overlays such a network and relieves the individual applications from dealing with the details of transporting information over the network. More particularly, the CORBA architecture hides all of the details and the actual network protocols from the application programs. It assures that the application programs operate with each other regardless of the platforms on which the software is designed to run and regardless of the network protocols used to interconnect separate computing systems.

Figure 3:
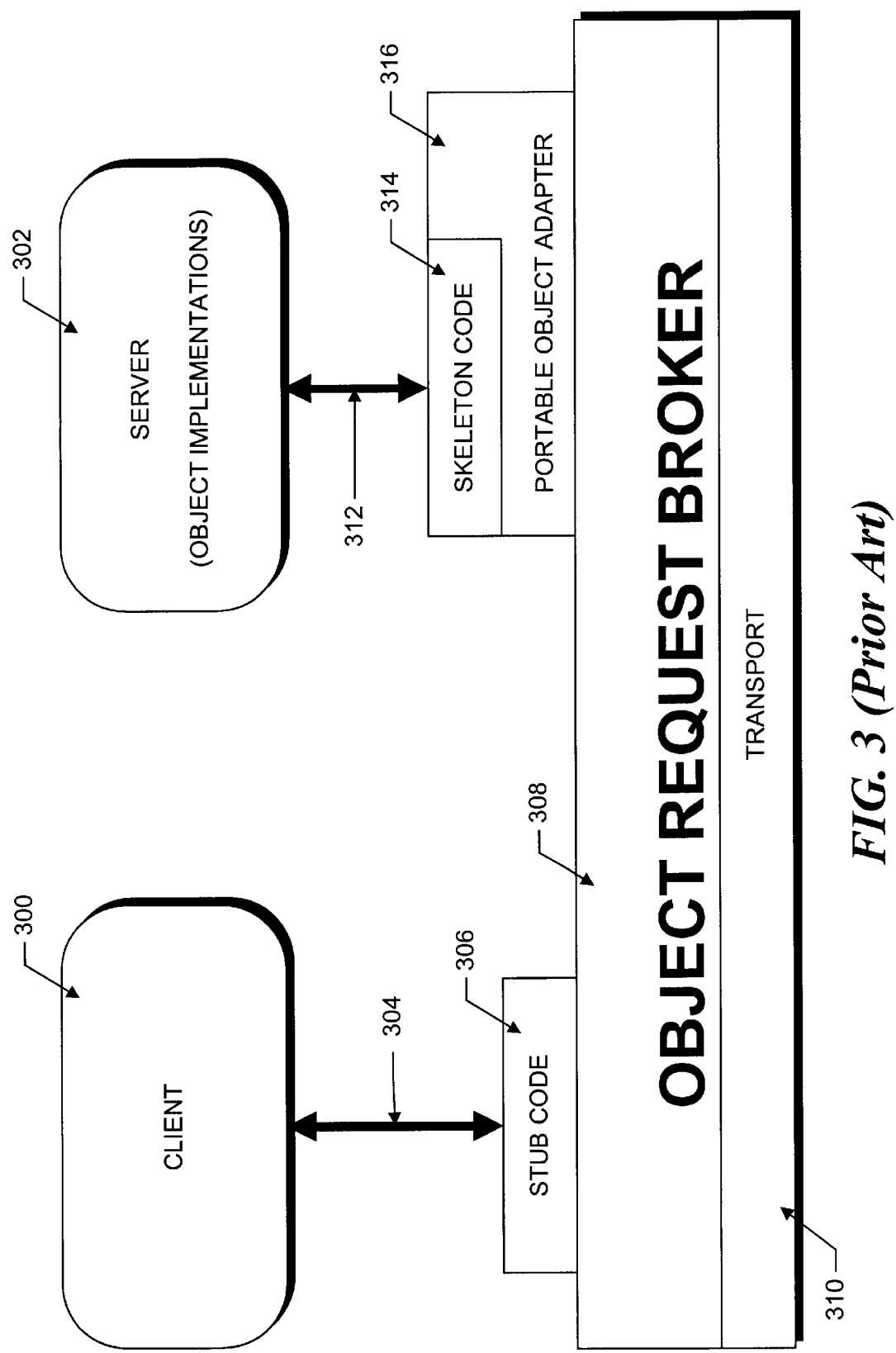
FIG. 3 is a block schematic diagram illustrating a prior art CORBA environment and showing the relationship of the client, ORB, object adapter and server.

FIG. 3 illustrates, in a very schematic form, the basic CORBA architecture which defines a peer-to-peer distributed computing facility where all applications are objects (in the sense of object orientation). Objects can alternate between client roles 300 and server roles 302. An object operates in a client role 300 when it is the originator of an object invocation. An object operates in a server role 302, called an object implementation, when it is the recipient of an object invocation.

The client 300 communicates with the server 302 by means of an object request broker or ORB 308. The ORB 308 operates with a transport 310 that conveys information between the client 300 and server 302 and, as previously mentioned, the ORB 308 handles the marshaling, transport and unmarshaling of information between client 300 and server 302. The client 300 communicates with the ORB 308, as indicated schematically by arrow 304, by means of an implementation independent syntax which describes object encapsulations. This syntax is called an interface definition language (IDL) and is defined in the CORBA specification generated by OMG. The OMG interface definition language can be used to define interfaces that have attributes and operation signatures. The language also supports inheritance between interface descriptions in order to facilitate reuse by developers. Objects or servants in the server 302 export object references with interfaces specified by the OMG IDL for use by clients. The object reference contains an identification of the object implementation so that the object adapter 316 can pass the request to the correct object in the server.

The entire CORBA architecture is actually implemented in a conventional programming language, such as C, C++, Java or Smalltalk. Implementations in a variety of languages are available from a number of vendors who typically provide a IDL compiler bundled with their ORB products. The IDL compilers generate header files which define the OMG IDL interfaces and can be incorporated into application programs. The IDL compilers also generate stub code 306 and skeleton code 314 for each interface.

The client application program 300 can link directly to the OMG IDL stub code 306. As far as the client application program is concerned, an invocation of the stub code 306 appears to be a local function call. Once invoked, the stub code 306 provides an interface to the ORB 308 that performs marshaling to encode and decode the operation's parameters into communication formats suitable for transmission on the transport 310 to the server 302.

At the server side, the OMG IDL skeleton code 314 is the corresponding implementation of the OMG IDL interface. When the ORB 308 receives a request, the skeleton code 314 unmarshals the request parameters and generates a call, indicated schematically by arrow 312, to an object implementation in the server 302. When the server completes processing of the request, the skeleton code 314 and stub code 306 return the results to the client program 300. If an error has occurred, exception information generated by the server or by the ORB is returned.

An object adapter 316 comprises the interface between the ORB 308, the skeleton code 314 and the server 302. Object adapters, such as adapter 316, support functions, such as registration of object implementations and activation of servers. There are many potential types of object adapters, depending on the purpose of the adapter. The original CORBA specification defined only a general-purpose Basic Object Adapter or BOA. The BOA performs some basic functions. For example, when a client request specifies an inactive server process, the BOA automatically activates the server process. When the server is activated it registers its implementation with the BOA. The BOA then stores this registration to use in future object requests. After an object is activated, it can receive client requests by means of a callback method in the skeleton code 314. BOA services also include exception handling and object reference management.

Figure 4:
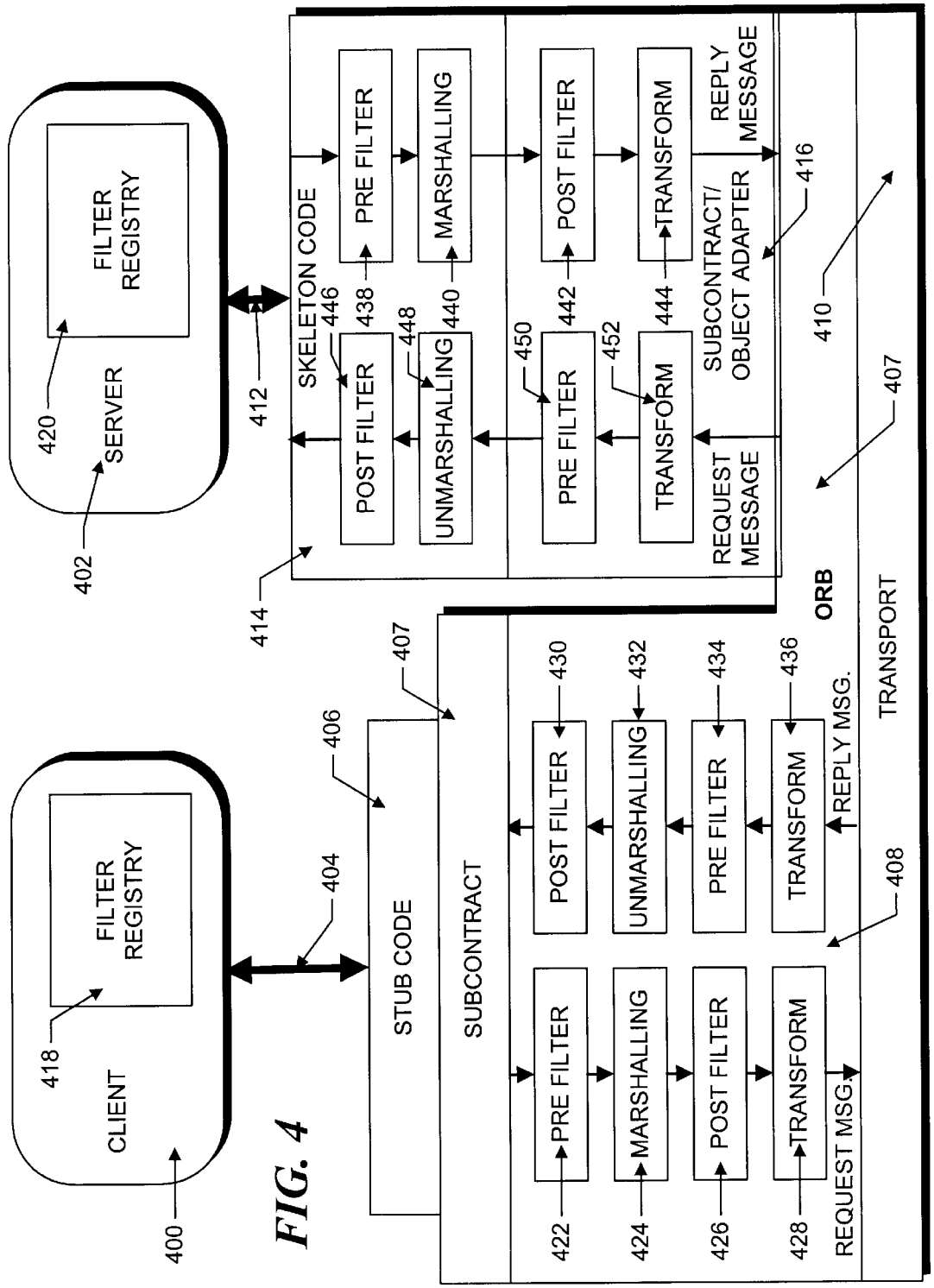
FIG. 4 is a block schematic diagram illustrating a CORBA environment and showing the location of various filters on the client and server sides.

The block schematic diagram of FIG. 4 illustrates the addition of filters to the FIG. 3 ORB architecture. In FIG. 4, elements which correspond to elements in FIG. 3 have been given corresponding numeral designations. For example, stub code 306 in FIG. 3 corresponds to stub code 406 in FIG. 4. On the client side, the client 400 interacts with the stub code 406 which, in turn, communicates with the ORB 408. The ORB 408 contains implementations of the client side filters 422–436. On the server side, the server filter registry 420 contains implementations of the server side filters 438–452.

Filters are classified in accordance with the relative place within a method invocation process where they are applied and depending on the type of message to which they are applied. Thus, the filters can be categorized as pre-request, post-request, pre-reply, and post-reply filters. The pre-request filters 422 and 450 are applied before marshaling 424 of arguments on the client side in a request message and before unmarshaling 448 the request arguments in the skeleton 414. The post-request filters 426 and 446 are applied after marshaling 424 of arguments on the client side and after unmarshaling 448 the request arguments in the skeleton 414. It should be noted that, although only one element is shown for each type of filter in FIG. 4, there may actually be several separate pre-filters, several separate post-filters, etc. Each filter can be separately enabled or disabled.

Similarly, the pre-reply filters 438 and 434 are applied before marshaling 440 of the reply results in the skeleton 414 and before unmarshaling 432 the reply results at the client side. The post-reply filters 442 and 430 are applied after marshaling 440 of result values in the skeleton 414 and after unmarshaling 432 the results at the client side.

Transform filters may also be employed to implement encryption and decryption of data or data compression. For example, client transform filter 428 could be employed to encrypt data which is decrypted by server transform filter 452 and server transform filter 444 would in turn encrypt data which is decrypted by client transform filter 436. There are two kinds of transform filters supported in the presently preferred embodiment of the invention, the request filter and the reply filter. The request filters, 428, 452, are invoked on the client side after all pre and post filters have been applied to the request message and on the server before pre and post filters are applied to the request message. The reply filters, 444, 436, are invoked on the server side after all pre and post filters have been applied to the reply message and on the client side before pre and post filters are applied to the reply message. The transform filters are applied only to the message body, not to the message header, because the object which is a part of the message header contains information that is required by the object request broker for dispatching the message to the appropriate subcontract and for selecting what particular transform filters to apply. However, a dummy message header could be generated in accordance with conventional protocols to allow for the application of transformation to the message header. This would allow for a proper dispatching to the correct subcontract.

FIG. 4 also illustrates a subcontract layer 407 in the ORB 408. The subcontract layer 407 and subcontract/object adapter 416 can be used to convey quality of service (QOS) information. Illustratively, as explained below, it may be used to specify whether the request and reply arguments are filterable or not.

Figure 5:
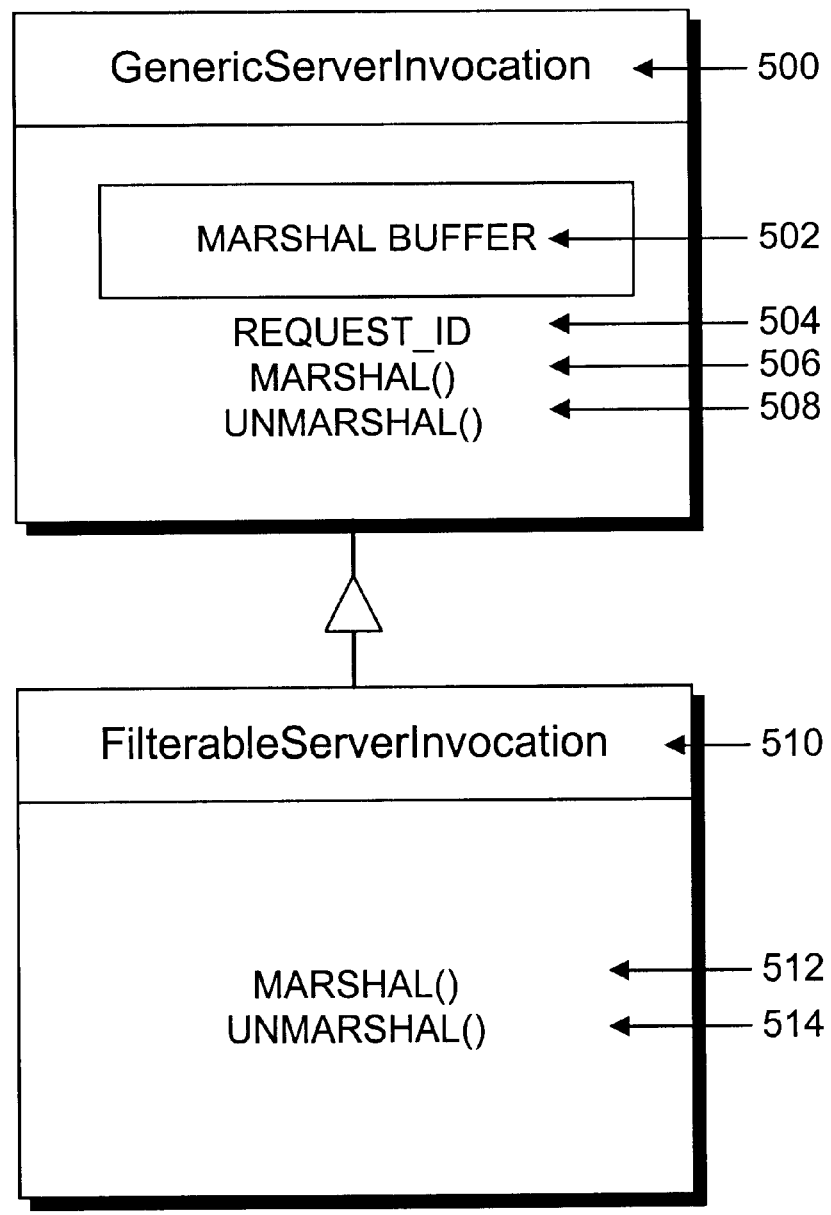
FIG. 5 is a class diagram using Object Management Technique (OMT) diagrams to illustrate the relationship of the generic and filterable server invocation classes.

A mechanism for implementing filters in the skeleton code is illustrated in FIG. 5. A generic class called GenericServerInvocation 500 is used to encapsulate the data, for example the marshal buffer 502, request ID 504 and other data (not shown). The generic class also includes methods, such as the marshal method 506 and unmarshal method 508. In a GenericServerInvocation object constructed from class 500, the unmarshal method 508 would unmarshal data from the marshal buffer 502 using the format described in the argument descriptor (generated by the skeleton), and the marshal method 506 would marshal the message header and results into the marshall buffer.

To support filterable behavior, one can extend the GenericServerinvocation class 500, to define a class called FilterableServerInvocation 510. The FilterableServerInvocation class 510 contains marshal and unmarshal methods, 512 and 514, which override the marshal and unmarshal methods, 506 and 508, of the GenericServerInvocation class 500.

Figure 6:
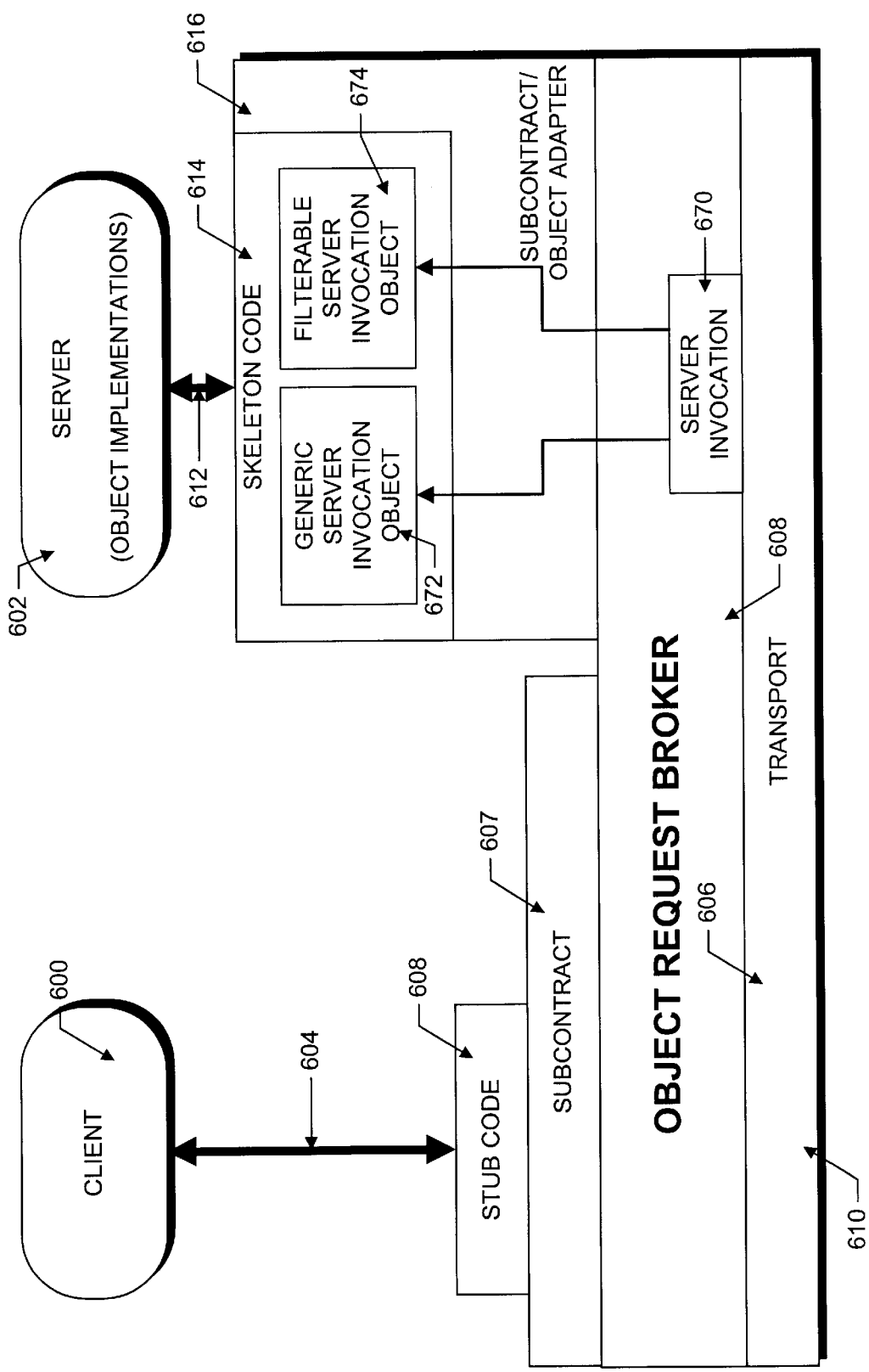
FIG. 6 is a block schematic diagram illustrating a CORBA environment and schematically illustrating an alternative server invocation object instantiation depending on whether the request and reply are filterable or not.
Figure 7:
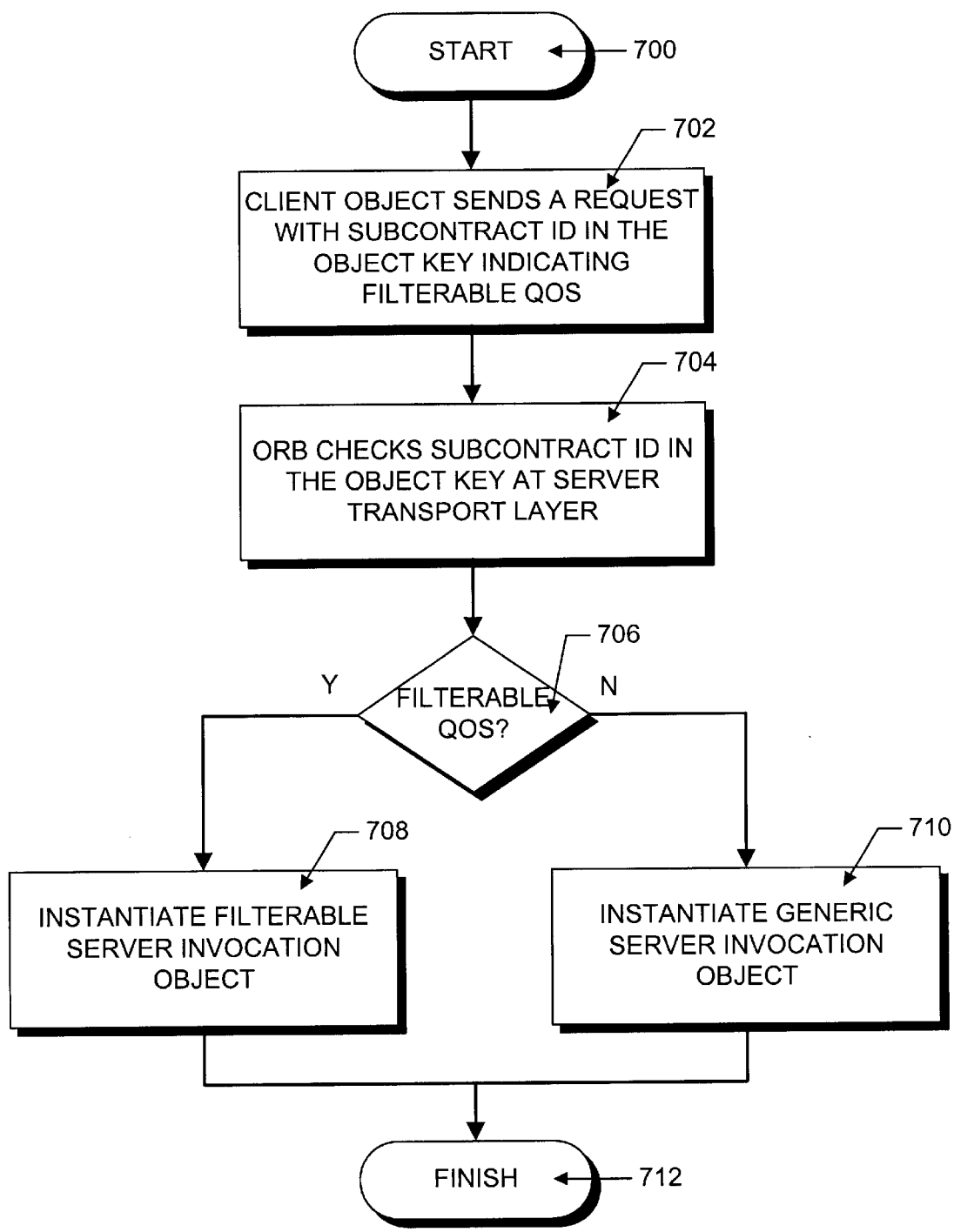
FIG. 7 is an illustrative flowchart describing the procedure followed by the ORB in instantiating the alternative server invocation objects.

The decision on which type of server invocation object should be generated is made at the ORB transport layer 610 as illustrated in FIGS. 6 and 7. As with FIG. 4, elements in FIG. 6 which correspond to elements in FIGS. 3 and 4 have been given corresponding numerals. A method invocation begins in step 700 and proceeds to step 702. As indicated in FIG. 7, during a method invocation, the client object 600 sends a request with a subcontract ID in the object key to indicate whether the quality of service is "filterable". In step 704, the ORB 608 checks the subcontract-ID in the object key as schematically illustrated by box 670. If, in step 706, the subcontract-ID indicates that the request is not filterable, then step 708 is executed where the ORB 608 creates a server invocation object 672 that is instance of the GenericServerInvocation class 500.

Alternatively, if, in step 706, the ORB 608 determines that the request is filterable, then, in step 710, the ORB creates a server invocation object 674 that is instance of the FilterableServerInvocation class 510.

If the GenericServerInvocation class 500 is instantiated, the marshal and unmarshal methods, 506 and 508, operate in a conventional fashion. However, if the FilterableServerInvocation class 510 is instantiated, the marshal method 512 of the FilterableServerInvocation class 510 overrides the marshal method 506 of the GenericServerInvocation class 500.

Figure 8:
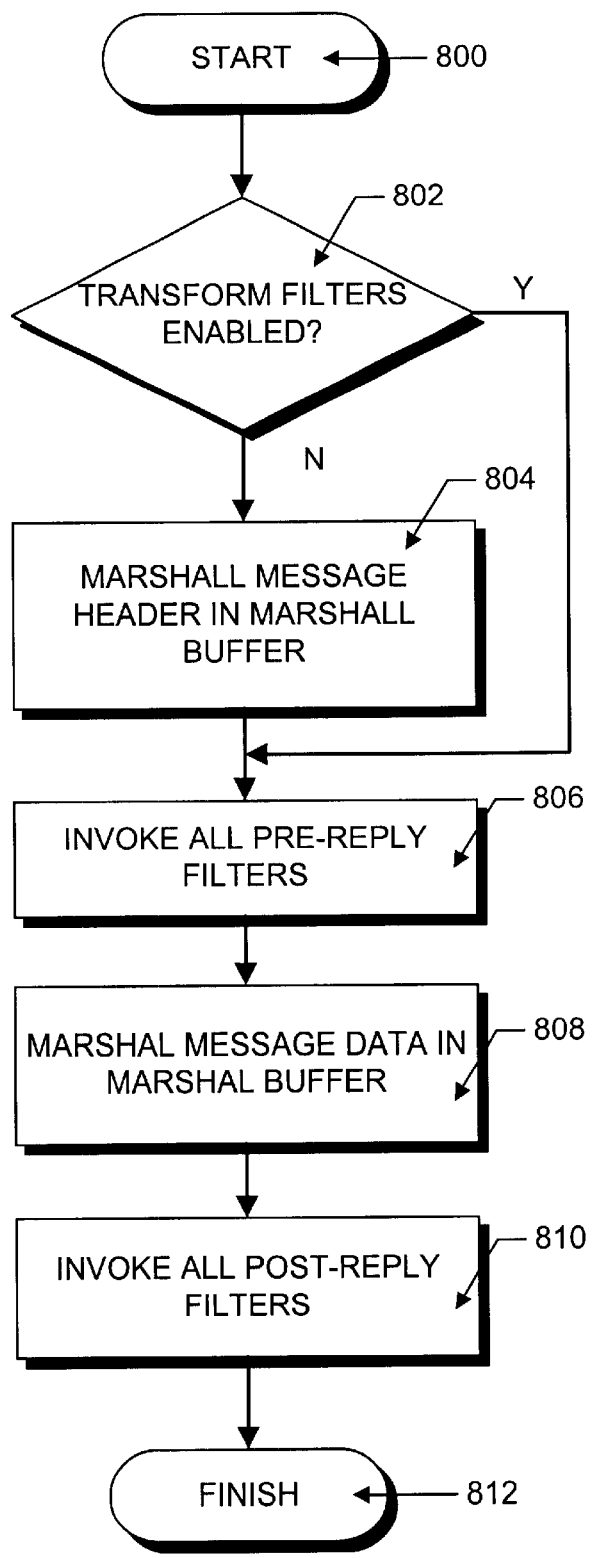
FIG. 8 is an illustrative flowchart describing the operation of the marshal method in a FilterableServerlnvocation object.

The operation of the marshal method 512 is illustrated in FIG. 8. The method starts in step 800 and proceeds to step 802 where a check is made to determine if transform filters are enabled. If transform filters are enabled, the message header is not marshaled in the marshal buffer 502. In this case, the method 512 skips to step 806. If transform filters are not enabled, then step 804 is executed where the message header information is marshaled into the marshal buffer 502.

In either case, the method 512 then invokes all of the pre-reply filters (step 806) marshals the message data into the marshal buffer 502 (step 808) and invokes all post-reply filters as set forth in step 810. The routine then ends in step 812.

Figure 9:
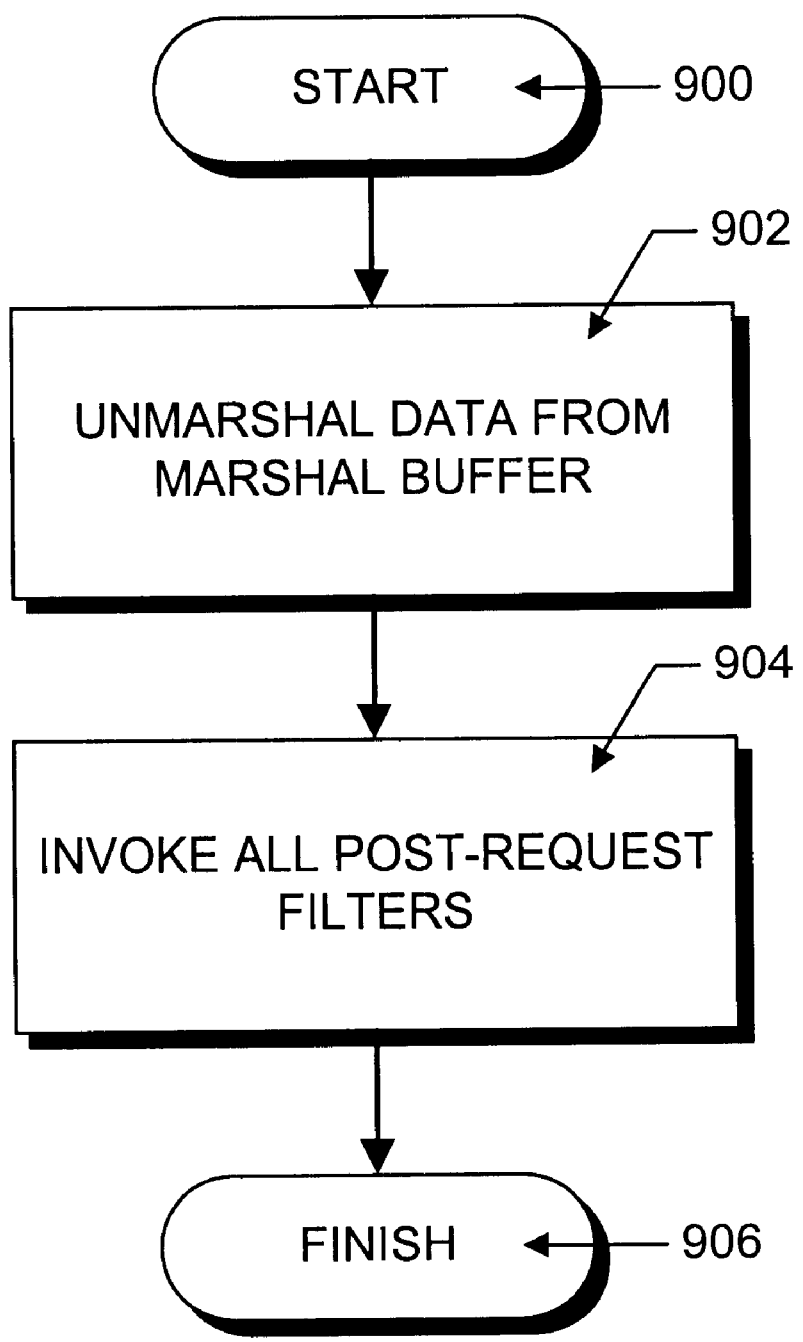
FIG. 9 is an illustrative flowchart describing the operation of the unmarshal method in a FilterableServerlnvocation object.

Similarly, if the FilterableServerInvocation class 510 is instantiated, the unmarshal method 514 of FilterableServerInvocation class 510 overrides the unmarshal method 508. The operation of the unmarshal method 514 is illustrated in FIG. 9. The method begins in step 900 and proceeds to step 902 where the method unmarshals arguments from the marshall buffer 502 using the argument descriptor which is generated by the skeleton code 614, and then, in step 904, the method invokes the post-request filters. The method then finishes in step 906.

A software implementation of the above-described embodiment may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, aspects such as the size of memory, number of bits utilized to represent the compact identifiers, and the specific configuration of logic and/or instructions utilized to achieve a particular function, as well as other modifications to the inventive concept are intended to be covered by the appended claims.

What is claimed is:

1. Apparatus for use in a distributed object system having client and server objects, the apparatus executing programmer specified code within implementation specific code connecting the server object to the distributed object system when generic marshal and unmarshal methods are executed during a method invocation, the generic unmarshal method unmarshaling a request generated by the client and the generic marshal method marshaling a reply generated by the method invocation, the apparatus comprising:

a filter which executes programmer specified code to process the request and the reply during the method invocation;

a generic class for constructing a generic server invocation object containing the generic marshal and unmarshal methods;

a filterable class derived from the generic class for constructing a filterable server invocation object containing overriding marshal and unmarshal methods that override the generic marshal and unmarshal methods, the overriding unmarshal method processing the request with the filter and unmarshaling the request and the overriding marshal method processing the reply with the filter and marshaling the reply; and a mechanism which examines the request and instantiates a server invocation object from the generic class when the request indicates that the method invocation is not filterable and instantiates a server invocation object from the filterable class when the request indicates that the method invocation is filterable.

2. Apparatus according to claim 1 wherein the filterable server invocation object contains overriding marshal and unmarshal methods that call the generic marshal and unmarshal methods and invoke the filter during processing.

3. Apparatus according to claim 1 wherein the distributed object system comprises an object request broker and wherein the mechanism for instantiating the server invocation object is located in the object request broker.

4. Apparatus according to claim 3 wherein the request contains a subcontract ID identifying whether the method invocation is filterable and wherein the mechanism for instantiating the server invocation object examines the subcontract ID to determine whether the method invocation is filterable.

5. Apparatus according to claim 4 wherein the subcontract ID is configured to specify a filterable quality of service.

6. Apparatus according to claim 1 wherein the generic server invocation object contains a marshal buffer and request ID field.

7. Apparatus according to claim 1 further comprising a transform filter which executes programmer specified code after the filter, wherein the request has a header and wherein the marshal method in the filterable server invocation object does not marshal the header when the transform filter is enabled.

8. A method for use in a distributed object system having client and server objects, the method executing programmer specified code within implementation specific code connecting the server object to the distributed object system when generic marshal and unmarshal methods are executed during a method invocation, the generic unmarshal method unmarshaling a request generated by the client and the generic marshal method marshaling a reply generated by the method invocation, the method comprising the steps of:

(a) constructing a filter which executes programmer specified code to process the request and the reply during the method invocation;

(b) creating a generic class for constructing a generic server invocation object containing the generic marshal and unmarshal methods;

(c) creating a filterable class derived from the generic class for constructing a filterable server invocation object containing overriding marshal and unmarshal methods that override the generic marshal and unmarshal methods, the overriding unmarshal method processing the request with the filter and unmarshaling the request and the overriding marshal method processing the reply with the filter and marshaling the reply; and (d) examining the request and instantiating a server invocation object from the generic class when the request indicates that the method invocation is not filterable and instantiating a server invocation object from the filterable class when the request indicates that the method invocation is filterable.

9. A method according to claim 8 wherein step (c) comprises the step of:

(c1) creating the filterable server invocation object with overriding marshal and unmarshal methods that call the generic marshal and unmarshal methods and invoke the filter during processing.

10. A method according to claim 8 wherein the distributed object system comprises an object request broker and wherein step (d) comprises the step of:

(d1) using a mechanism in the object request broker to instantiate the server invocation object.

11. A method according to claim 10 wherein the request contains a subcontract ID identifying whether the method invocation is filterable and wherein step (d) comprises the step of:

(d2) examining the subcontract ID to determine whether the method invocation is filterable.

12. A method according to claim 11 wherein step (d) comprises the step of:

(d3) configuring the subcontract ID to specify a filterable quality of service.

13. A method according to claim 8 wherein step (b) comprises the step of:

(b1) creating a generic server invocation class that instantiates a generic server invocation object that contains a marshal buffer and request ID field.

14. A method according to claim 8 wherein step (a) comprises the step of:

(a1) constructing a transform filter which executes programmer specified code after the filter, and wherein the request has a header and wherein the method further comprises the step of:

(e) causing the filterable server invocation object to skip marshaling of the header when the transform filter is enabled.

15. A computer program product for use in a distributed object system having client and server objects, the computer program product causing the execution of programmer specified code within implementation specific code connecting the server object to the distributed object system when generic marshal and unmarshal methods are executed during a method invocation, the generic unmarshal method unmarshaling a request generated by the client and the generic marshal method marshaling a reply generated by the method invocation, the computer program product comprising a computer usable medium having computer readable program code thereon including:

program code for constructing a filter which executes programmer specified code to process the request and reply during the method invocation;

generic server invocation class code constructing a generic server invocation object containing the generic marshal and unmarshal methods;

filterable server invocation class code for creating a filterable class derived from the generic class for constructing a filterable server invocation object containing overriding marshal and unmarshal methods that override the generic marshal and unmarshal methods, the overriding unmarshal method processing the request with the filter and unmarshaling the request and the overriding marshal method processing the reply with the filter and marshaling the reply; and program code for examining the request and instantiating a server invocation object from the generic class when the request indicates that the method invocation is not filterable and instantiating a server invocation object from the filterable class when the request indicates that the method invocation is filterable.

16. A computer program product according to claim 15 wherein the filterable server invocation class code comprises program code that calls the generic marshal and unmarshal methods and invokes the filter during processing.

17. A computer program product according to claim 15 wherein the distributed object system comprises an object request broker and the program code for examining the request comprises program code in the object request broker which instantiates the server invocation object.

18. A computer program product according to claim 17 wherein the request contains a subcontract ID identifying whether the method invocation is filterable and wherein the program code for examining the request comprises program code for examining the subcontract ID to determine whether the method invocation is filterable.

19. A computer program product according to claim 18 wherein the program code for examining the request comprises program code for configuring the subcontract ID to specify a filterable quality of service.

20. A computer program product according to claim 15 wherein the generic server invocation class code comprises program code for instantiating a generic server invocation object that contains a marshal buffer and request ID field.

21. A computer program product according to claim 15 wherein the program code for constructing a filter comprises program code for constructing a transform filter which executes programmer specified code after the filter, and wherein the request has a header and wherein the computer program product further comprises program code for skipping marshaling of the header when the transform filter is enabled.

* * * * *